G. E. LEWIS.
WOVEN BASKET.
APPLICATION FILED MAY 14, 1921.
1,408,367. Patented Feb. 28, 1922.
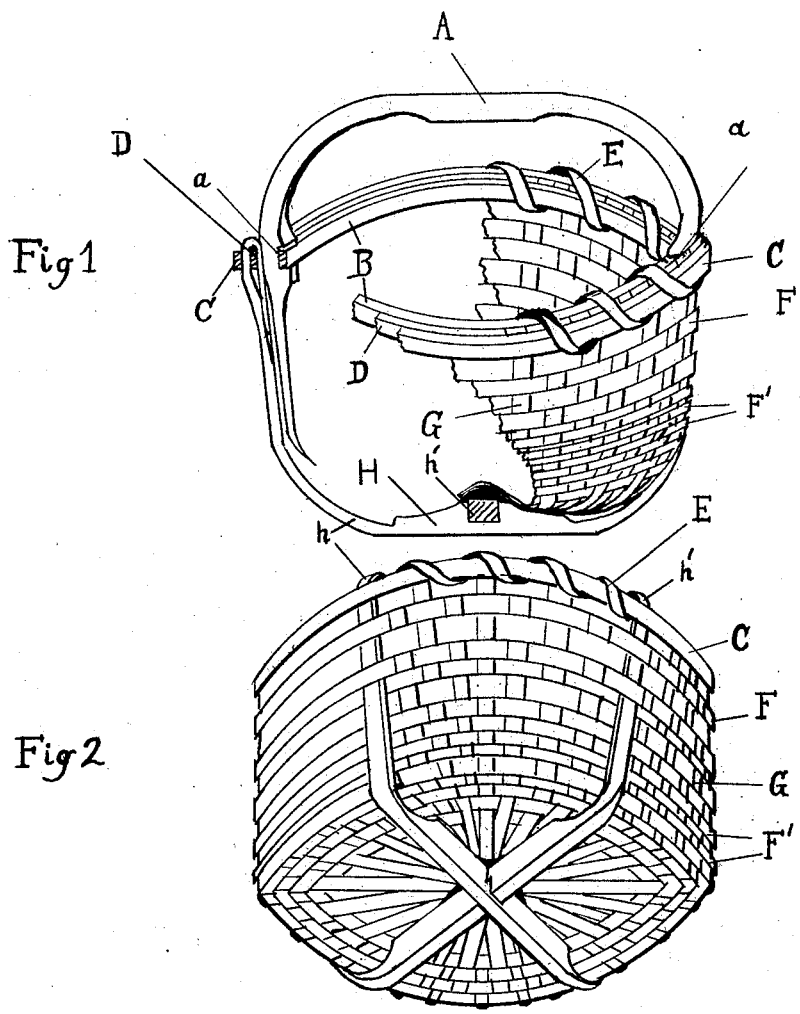
Inventor
George Edward Lewis
By Beale & Park
Attorney

UNITED STATES PATENT OFFICE.

GEORGE EDWARD LEWIS, OF OTTUMWA, IOWA.

WOVEN BASKET.

1,408,367.  Specification of Letters Patent.  Patented Feb. 28, 1922.

Application filed May 14, 1921. Serial No. 469,491.

*To all whom it may concern:*

Be it known that I, GEORGE EDWARD LEWIS, a citizen of the United States, residing at Ottumwa, in the county of Wapello and State of Iowa, have invented certain new and useful Improvements in Woven Baskets; and I hereby declare that the following is a full, clear, and exact description thereof, reference being had to the accompanying drawings, which form part of the specification.

My invention relates to baskets composed of interwoven strips.

The object of my invention is to strengthen and improve the construction of baskets of this type and produce a stronger and a more durable article.

It is also my object to provide a novel form of handle held in position on opposite sides of the basket by a binding hoop, whereby I am enabled to dispense with nails or other fastenings liable to weaken the handle or to become unfastened and also to safeguard its dislodgment either from lifting stress or downward or sidewise jar.

It is also my object to supply a bottom shield and side and top brace extending to the top of the basket doubled thereover and partway returned and bound in place by the woven basket strips.

Referring to the drawings Figure 1 is a perspective view of my basket looking inside and partly broken away. Figure 2 is a perspective view of my basket from the outside.

Referring by letters to corresponding parts in the drawings:

A denotes the handle formed in one piece its ends extending down upon the inside of the basket well into the bottom. *a a* denote recesses formed in the handle. B denotes a binding hoop placed at the top of the basket on the inside and is sprung into the handle recesses *a a* at points opposite. Thus the weight of basket and contents are supported by hoop B and handle A.

The main support for the basket is formed of the inner hoop B and outer hoop C and an intermediate binding strip D. Said hoops and strip are bound together by a heavy lacing strip E which also binds upon each side handle A and ties the inner hoop B into said handle recesses *a a*.

Of the woven strips forming the sides and bottom of the basket F denotes the horizontal strips and G the strips woven in at right angles to strip F in the usual manner of woven strip baskets, in forming the lower portion of the sides and the bottom of the basket I weave in a series of narrow strip F′ instead of the wider strip F employed at the upper and middle portion of the basket sides; by this construction greater strength and better appearance is afforded. The bottom of the basket is raised at the center as hereinafter described.

H denotes a bottom shield formed of two pieces *h h′* crossed at right angles and mortised together, their ends extending up at points quartering on the basket sides, to the top, and doubled over the the top binding strip D and bound in by the strip F.

The strips *h h′* are formed with a mortise to admit of their proper connection and at this point said strips are much thicker to admit of the mortising and also for the purpose of forming a support projecting upward and forming a support underneath the raised portion of the bottom of the basket hereinbefore mentioned.

Claim—

The combination with a basket of a bottom support and side brace therefor formed of two arms crossed at right angles under the bottom of the basket mortised at their point of intersection and adapted to support the raised central portion of said bottom.

In testimony that I claim the foregoing as my own, I affix my signature.

GEORGE EDWARD LEWIS.